US006583591B2

(12) United States Patent
Echols et al.

(10) Patent No.: US 6,583,591 B2
(45) Date of Patent: Jun. 24, 2003

(54) CIRCUIT FOR OPERATING A PLURALITY OF BI-DIRECTIONAL MOTORS

(75) Inventors: Jylain Echols, Detroit, MI (US); Gil Shultz, Northville, MI (US)

(73) Assignee: Yazaki North America, Inc., Canton, MI (US)

( * ) Notice: Subject to any disclaimer, the term of this patent is extended or adjusted under 35 U.S.C. 154(b) by 231 days.

(21) Appl. No.: 09/758,703

(22) Filed: Jan. 10, 2001

(65) Prior Publication Data

US 2002/0117980 A1 Aug. 29, 2002

(51) Int. Cl.[7] ............................................... H02P 7/68
(52) U.S. Cl. ........................ 318/112; 318/65; 318/105
(58) Field of Search ......................... 318/34, 37, 38, 318/51, 65, 83, 93, 105, 112

(56) References Cited

U.S. PATENT DOCUMENTS

| 4,614,901 A | * | 9/1986 | Kullman et al. .............. 318/99 |
| 4,638,222 A | * | 1/1987 | Sawaki ........................ 318/111 |
| 4,644,232 A | * | 2/1987 | Nojiri et al. ................... 318/66 |
| 4,774,441 A | * | 9/1988 | Toyomasu et al. ........... 318/102 |
| 4,883,974 A | | 11/1989 | Tinder |
| 4,990,835 A | | 2/1991 | Ohnishi et al. |
| 5,087,864 A | * | 2/1992 | Abel ............................ 318/34 |
| 5,194,756 A | | 3/1993 | Darbesio |
| 5,420,485 A | * | 5/1995 | Campbell, Jr. ................ 318/34 |
| 5,424,624 A | | 6/1995 | Senak, Jr. |
| 5,528,114 A | * | 6/1996 | Tokizaki et al. ............... 318/67 |
| 5,713,613 A | | 2/1998 | Honma et al. |
| 5,742,143 A | | 4/1998 | Katagiri |
| 5,828,200 A | | 10/1998 | Ligman et al. |
| 6,344,719 B2 | * | 2/2002 | Shibazaki et al. ............. 318/34 |
| 6,353,296 B1 | * | 3/2002 | Specks et al. ................. 318/34 |

OTHER PUBLICATIONS

Description of prior art by inventor Gil Shultz (2 sheets) excerpted from Yazaki invention disclosure form; Jul. 14, 1999.

* cited by examiner

Primary Examiner—Robert E. Nappi
Assistant Examiner—Eduardo Colon-Santana
(74) Attorney, Agent, or Firm—Young & Basile P.C.

(57) ABSTRACT

The present invention provides a circuit for operating a plurality of bi-directional motors, each motor having a pair of terminals disposed across the motor. The circuit includes a common half bridge for providing one of power and ground to one of the pair of terminals across each motor. A plurality of particular or individual half bridges, one particular half bridge for each motor, provide the other of power and ground to the other of the pair of terminals across each motor. A controller selectively controls the common half bridge and the particular half bridges to supply power in either direction across the pair of terminals of one or more of the motors. In a preferred embodiment, the controller selectively controls the common half bridge and the particular half bridges to independently pulse width modulate power in either direction across the pair of terminals of one or more of the plurality of motors. To simultaneously operate two or more motors in the same direction or opposite directions, the controller selectively controls the common half bridge and the particular half bridges to energize the two or more motors in a sequential or random order.

16 Claims, 2 Drawing Sheets

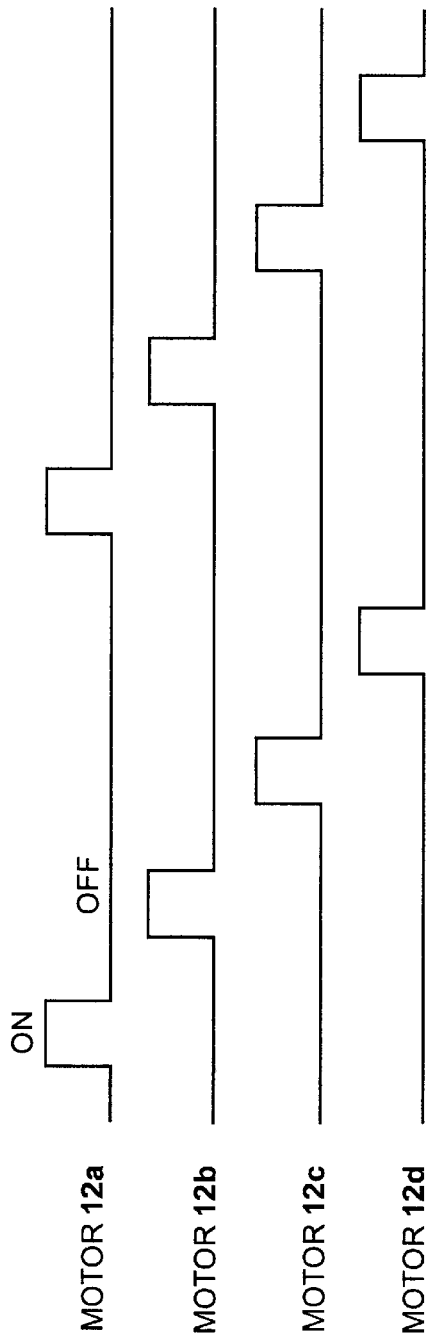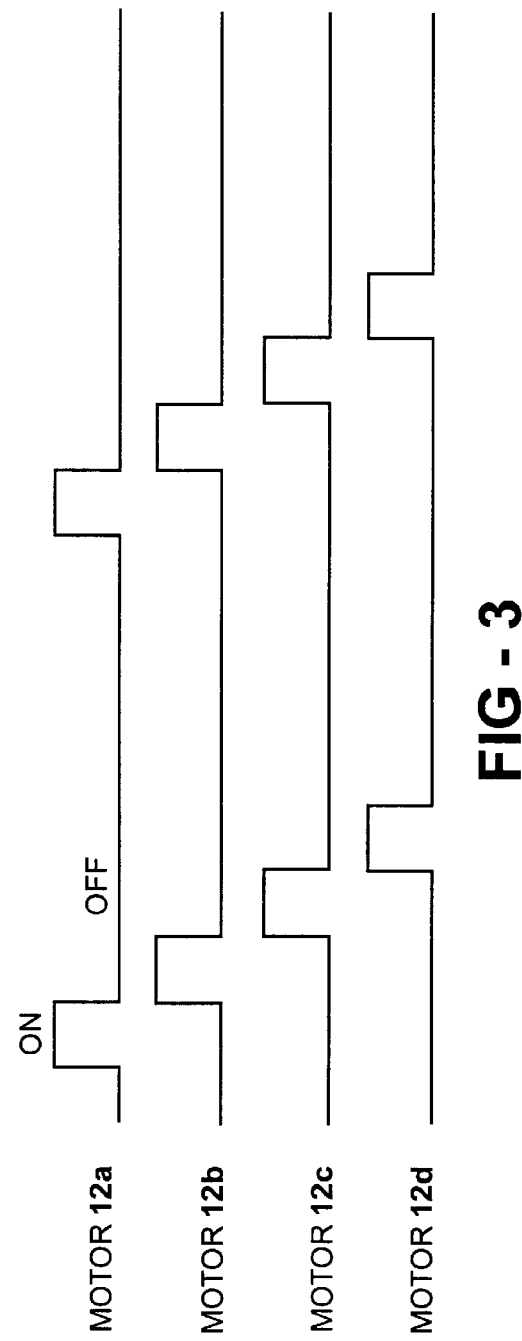

US 6,583,591 B2

CIRCUIT FOR OPERATING A PLURALITY OF BI-DIRECTIONAL MOTORS

FIELD OF THE INVENTION

The present invention relates to circuits for operating a plurality of bi-directional motors and, more particularly, to circuits for operating a plurality of bi-directional motors with a system voltage greater than a motor operating voltage.

BACKGROUND OF THE INVENTION

Prior art circuits for operating a plurality of bi-directional motors have included a H-shaped full bridge driver for each motor. In this type of circuit design, each H-shaped full bridge driver, often referred to as a H-bridge driver, is controlled by a microprocessor to operate the respective motor in either the forward or reverse direction independent of the other motors.

Each H-bridge driver requires four electrical switching components, such as transistors or relays. Thus, a prior art control circuit for operating four bi-directional motors requires sixteen switching components. The addition of each switching component to a control circuit decreases the reliability of the control circuit and increases the cost of the control circuit. Further, each switching component requires a separate microprocessor control port increasing the cost of the microprocessor.

SUMMARY OF THE INVENTION

The present invention provides a circuit for operating a plurality of bi-directional motors, each motor having a pair of terminals disposed across the motor. The circuit includes a common half bridge for providing one of power and ground to one of the pair of terminals across each motor. A plurality of particular or individual half bridges, one particular half bridge for each motor, provide the other of power and ground to the other of the pair of terminals across each motor. A controller selectively controls the common half bridge and the particular half bridges to supply power in either direction across the pair of terminals of one or more of the motors.

In a preferred embodiment, the controller selectively controls the common half bridge and the particular half bridges to independently pulse width modulate power in either direction across the pair of terminals of one or more of the motors. To simultaneously operate two or more motors in the same direction or opposite directions, the controller selectively controls the common half bridge and the particular half bridges to energize the two or more motors in a sequential or random order.

The present invention provides particular advantages when utilized in an electrical system providing a system voltage greater than a motor operating voltage, e.g. in a vehicle having an electrical system providing a forty-two volt system voltage to operate twelve volt motors. With the system voltage being greater than the motor operating voltage, power can be pulsed or pulse width modulated independently to each motor. By pulse width modulating the system voltage at the appropriate duty cycle, all motors can be operated simultaneously or concurrently at full power with each individual motor being driven in a direction independent of the other motors. The duty cycle of the pulse width modulation can be varied to (1) increase power to and thereby increase the speed of a selected motor if, for example, the motor is stalled, or (2) decrease power to and thereby decrease the speed of selected motors if, for example, the electrical system is overloaded. The circuit can shed loads (i.e. stop powering or energizing selected motors if the electrical system is overloaded). When a reduced amount of supply power or system voltage is available, the circuit can share the reduced amount of power or voltage among loads (i.e. operate the motors at a reduced speed or power).

BRIEF DESCRIPTION OF THE DRAWINGS

The description herein makes reference to the accompanying drawings wherein like reference numerals refer to like parts throughout the several views, and wherein:

FIG. 2 is a timing graph indicating when each of the plurality of bi-directional motors is energized in accordance with a first timing sequence; and FIG. 3 is a timing graph indicating when each of the plurality of bi-directional motors is energized in accordance with a second timing sequence.

DESCRIPTION OF THE PREFERRED EMBODIMENT

Figure 1:
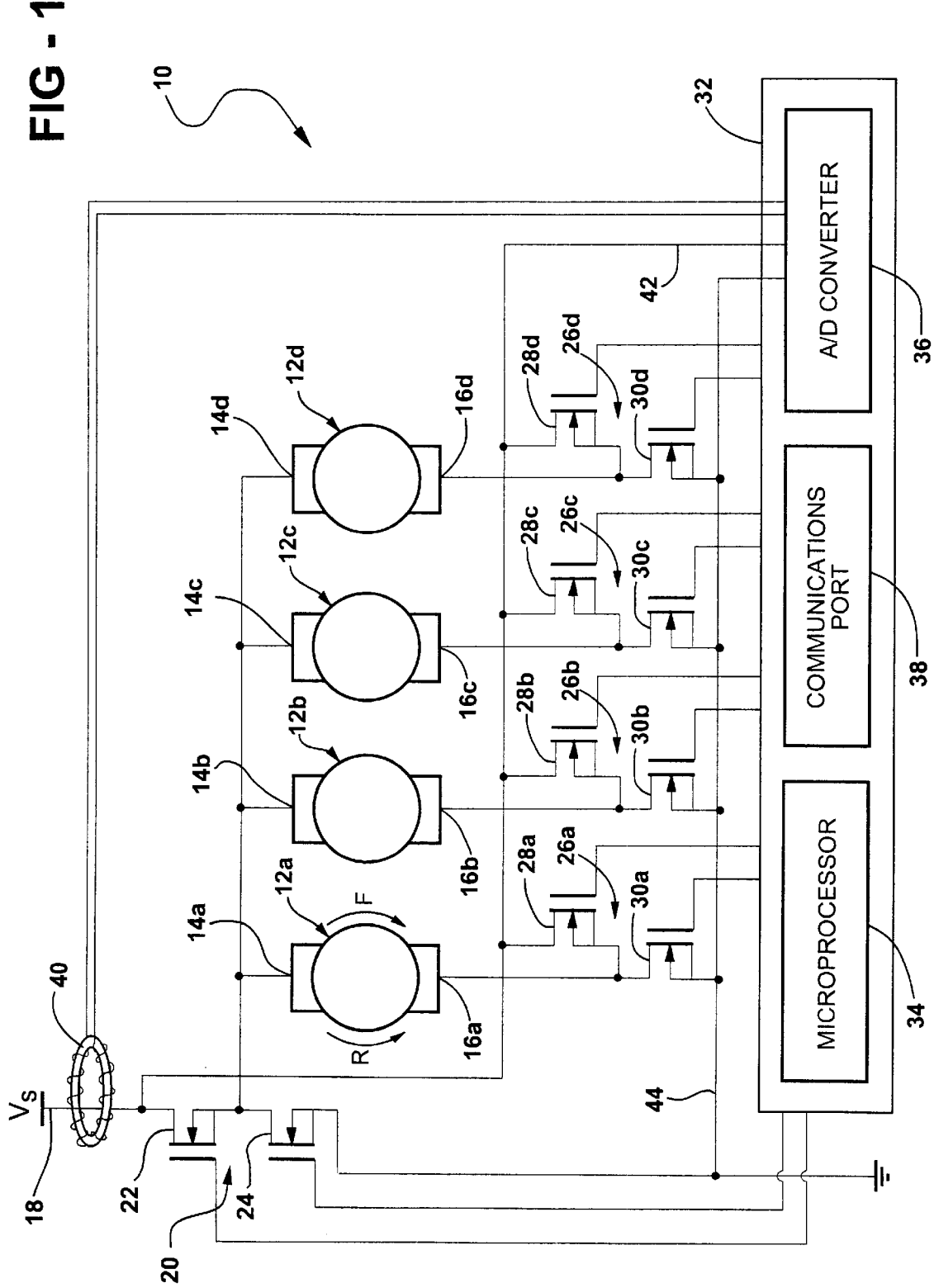
FIG. 1 is a schematic of a circuit for operating a plurality of bi-directional motors in accordance with the present invention.

FIG. 1 is a schematic of a circuit 10 for operating a plurality of bi-directional motors 12a–d in accordance with the present invention. For exemplary purposes only and not to limit the scope of the present invention, FIG. 1 illustrates four bi-directional or reversible, electrical motors 12a–d, however, the present invention can also be used to operate a plurality of uni-directional motors. A pair of terminals 14a–d and 16a–d are disposed across each motor 12a–d respectively. The circuit 10 includes a power supply input 18 for receiving system voltage ($V_S$). In most preferred applications of the present invention, the system voltage ($V_S$) supplied to the circuit 10 is greater than voltage required to operate the motors 12a–d or, in other words, the motor operating voltage. For example, in one preferred application, the system voltage ($V_S$) is forty-two volts and the motor operating voltage is typically twelve volts. Accordingly, further description of the circuit 10 and the operation thereof is provided below with respect to a forty-two volt system voltage ($V_S$) and a typical twelve volt motor operating voltage.

The circuit 10 includes a common or main half bridge 20 for providing or switching system voltage ($V_S$) or ground to the first terminal 14a–d of each motor 12a–d. More specifically, the common half bridge 20 includes a high-side driver 22 and a low-side driver 24. When the high-side driver 22 is closed or operated in the ON state and the low-side driver 24 is open or operated in the OFF state, system voltage ($V_S$) is supplied to the first terminal 14a–d of each motor 12a–d. When the low-side driver 24 is closed or operated in the ON state and the high-side driver 22 is open or operated in the OFF state, ground is connected to the first terminal 14a–d of each motor 12a–d.

A plurality of particular or individual half bridges 26a–d, with one particular half bridge 26a–d in electrical communication with only one motor 12a–d respectively, provide or switch the other of power or ground to the second terminal 16a–d across each motor 12a–d. Each particular half bridge 26a–d includes a high-side driver 28a–d and a low-side driver 30a–d respectively. When a high-side driver 28a–d is closed or operated in the ON state and the respective low-side driver 30a–d open or operated in the OFF state, system voltage ($V_S$) is supplied to the second terminal 16a–d of the respective motor 12a–d. When the low-side driver 30a–d is closed or operated in the ON state and the respective high-side driver 28a–d is open or operated in the OFF state, ground is connected to the second terminal 16a–d of the respective motor 12a–d. Preferably the high-side drivers 22 and 28a–d and the low-side drivers 24 and 30a–d are MOSFETs (metal oxide semiconductor field effect transistors) however, other types of electrical switching components, such as bi-polar junction transistors or relays, can also be used in the circuit 10.

A controller 32 selectively controls the common half bridge 20 and the particular half bridges 26a–d to supply power in either direction across the pair of terminals 14a–d and 16a–d of one or more of the motors 12a–d. In a preferred embodiment, the controller 32 selectively controls the common half bridge 20 and the particular half bridges 26a–d to independently pulse width modulate (PWM) system voltage ($V_S$) for a duty cycle and provide motor operating voltage in either direction across the pair of terminals 14a–d and 16a–d of one or more of the motors 12a–d.

The controller 32 pulse width modulates the system voltage ($V_S$) to a RMS (root mean square) voltage equal to the motor operating voltage by rapidly switching the respective high-side driver 22, 28a, 28b, 28c, or 28d open and closed or between the ON and OFF states. For example, to operate the first motor 12a in a forward direction indicated by the arrow labeled F in FIG. 1, the controller 32 operates the first low-side driver 30a in the ON state to connect the second terminal 16a of the motor 12a to ground and rapidly switches the common high-side driver 22 open and closed to pulse width modulate the system voltage ($V_S$) to the motor operating voltage provided to the first terminal 14a of the motor 12a. Alternatively, the controller 32 can operate the common high-side driver 22 in the ON state to supply the system voltage ($V_S$) to the first terminal 14a of the motor 12a and rapidly switch the first low-side driver 30a open and closed to pulse width modulate the system voltage ($V_S$) to the motor operating voltage from the first terminal 14a to the second terminal 16a of the motor 12a. To operate the first motor 12a in a reverse direction indicated by the arrow labeled R in FIG. 1, the controller 32 operates the common low-side driver 24 in the ON state to connect the first terminal 14a of the motor 12a to ground and rapidly switches the first high-side driver 28a open and closed to pulse width modulate the system voltage ($V_S$) to the motor operating voltage provided to the second terminal 16a of the motor 12a. Alternatively, the controller 32 can operate the first high-side driver 28a in the ON state to supply the system voltage ($V_S$) to the second terminal 16a of the motor 12a and rapidly switch the common low-side driver 24 open and closed to pulse width modulate the system voltage ($V_S$) to the motor operating voltage from the second terminal 16a to the first terminal 14a of the motor 12a.

The appropriate duty cycle or, in other words, the ratio of ON time to OFF or idle time, is calculated by the controller 32 from the system voltage ($V_S$) to yield the RMS voltage (duty cycle=(target RMS voltage/system voltage)$^2$). Thus, when the system voltage ($V_S$) is forty-two volts and the motors 12a–d require twelve volts, the controller 32 pulse width modulates the system voltage ($V_S$) accordingly to provide a RMS voltage of twelve volts.

To simultaneously or concurrently operate two or more motors 12a–d in either the same direction or opposite directions, the controller 32 selectively controls the common half bridge 20 and the particular half bridges 26a–d to energize the motors 12a–d in a sequential order or timing sequence. During the timing sequence, motor operating voltage is not continuously supplied to each motor 12a–d. Motor operating voltage is supplied to the respective motor 12a–d only for a period of time, i.e. the duty cycle ON time period. Thus, the controller 32 pulse width modulates a motor operating voltage for the duty cycle ON time and in a predetermined direction across the terminals 14a–d and 16a–d of the motors 12a–d sequentially.

FIG. 2 is a timing graph indicating when each of the motors 12a–d is energized in accordance with a first timing sequence. During this first timing sequence, the first motor 12a is energized with a PWM voltage for one duty cycle ON time period then de-energized. After one delay time period, the second motor 12b is energized with a PWM voltage for one duty cycle ON time period then de-energized. After one delay time period, the third motor 12c is energized with a PWM voltage for one duty cycle ON time period then de-energized. After one delay time period, the fourth motor 12d is energized with a PWM voltage for one duty cycle ON time period then de-energized. This first timing sequence is then repeated. For example, when operating the first twelve volt motor 12a from a forty-two volt system voltage ($V_S$), the duty cycle of the pulse width modulation is approximately 10% which equates to 1 millisecond ON time period and 9 millisecond OFF time period at 100 Hz. During the 9 millisecond OFF time period, other motors 12b–d operated by the circuit 10 are pulsed at a 10% duty cycle. In this manner, the present invention can simultaneously or concurrently operate a plurality of bi-directional motors in either the same direction or opposite directions.

The timing sequence does not control the direction of motor operation and, thus, FIG. 2 does not indicate which direction each motor 12a–d is operated. The direction of operation of each motor 12a–d is controlled by the direction of the voltage drop across or the current flow between the pair of terminals 14a–d and 16a–d as described above. Thus, the controller 32 can operate the first motor 12a in one direction while simultaneously operating one or more another motors 12b, 12c, and/or 12d in the opposite direction.

FIG. 3 is a timing graph indicating when each of the motors 12a–d is energized in accordance with a second timing sequence. During this second timing sequence, the first motor 12a is energized with a PWM voltage for one duty cycle ON time period. The second motor 12b is energized with a PWM voltage for one duty cycle ON time period when the first motor 12a is de-energized or, in other words, the second motor 12b is switched ON at the same time the first motor 12a is switched OFF. The third motor 12c is energized with a PWM voltage for one duty cycle ON time period when the second motor 12b is de-energized or, in other words, the third motor 12c is switched ON at the same time the second motor 12b is switched OFF. The fourth motor 12d is energized with a PWM voltage for one duty cycle ON time period when the third motor 12c is de-energized or, in other words, the fourth motor 12d is switched ON at the same time the third motor 12c is switched OFF. After a time delay period, this second timing sequence is then repeated.

To reduce or eliminate electrical and audible noise produced during operation of the circuit 10, the controller 32 can also selectively control the common half bridge 20 and the particular half bridges 26a–d to energize the motor 12a–d in a random order or timing sequence.

Referring back to FIG. 1, the controller 32 includes a microprocessor 34, an A/D converter 36, and communications port 38. The microprocessor 34, A/D converter 36, and communications port 38 may be produced on a single piece of silicon or, alternatively, the circuit 10 may be implemented in hardware. The microprocessor 34 executes a program to control the circuit 10. The A/D converter 36 receives analog signals, converts the analog signals to digital signals, and transmits the digital signals to the microprocessor 34. The communications port 38 receives and transmits multiplexed communication signals. The multiplexed communication signals can be used for diagnostic and control information as well as command inputs. For example, if a motor 12a–d fails, then failure information can be transmitted via the communications port 38 to another node for later retrieval thus eliminating the need for non-volatile memory in the controller 32. Operating parameters can also be obtained via the communications port 38 from a remote node. The communications port 38 can also enable communications with the World Wide Web.

A current sensor 40 provides a system current load signal to the A/D converter 36. In response to the system current load signal, the controller 32 can (1) adjust the duty cycle of the pulse width modulation and/or (2) alter the timing sequence or the order in which the motors 12a–d are energized. For example, if a overload condition is detected from the system current load signal, the controller 32 can (1) reduce the ON time period of the duty cycle of the pulse width modulation to the motors 12a–d and/or (2) shed the operation of selected motors 12a–d from the timing sequence.

A system voltage circuit 42 provides a system voltage signal to the A/D converter 36. In response to the system voltage signal, the controller 32 can (1) adjust the duty cycle of the pulse width modulation and/or (2) alter the timing sequence or the order in which the motors 12a–d are energized. For example, if a low system voltage condition is detected from the system voltage signal, the controller 32 can (1) reduce the ON time period of the duty cycle of the pulse width modulation to the motors 12a–d (i.e. share the reduced amount of power among the loads) and/or (2) shed the operation of selected motors 12a–d from the timing sequence.

A system ground voltage circuit 44 provides a system ground referenced voltage signal to the A/D converter 36. In response to the system ground referenced voltage signal, the controller 32 can (1) adjust the duty cycle and/or frequency of the pulse width modulation and/or (2) alter the timing sequence or the order in which the motors 12a–d are energized. For example, if a shorted motor condition (e.g. a short circuit, soft short, or locked rotor) is detected from the system ground referenced voltage signal, the controller 32 can (1) alter the ON time period of the duty cycle and/or frequency of the pulse width modulation to the shorted motor and/or (2) shed the operation of the shorted motor from the timing sequence. Further, if a locked rotor condition is detected, the controller 32 can increase power to the associated motor in an attempt to free the rotor from the locked condition. Increasing the power to a selected motor allows for the starting of heavy loads.

With such system voltage and current information, the controller 32 can also provide many additional advanced motor control and load management features. For example, if the controller 32 determines there is insufficient power available to operate the motors as requested, the controller 32 can prioritize the motor operation requests appropriately. If needed, the controller 32 can determine the maximum number of motors which the circuit 10 can operate, prioritize incoming motor operation requests, and develop and execute a motor operation sequence wherein low-priority operation requests are shed until additional power becomes available as high-priority operations are completed. Additionally, the controller 32 can execute a fall back mode in which the circuit 10 operates similar to the prior art. More specifically, in the fall back mode the controller 32 would operate only one motor 12a–d at a time. If the system voltage ($V_S$) fluctuates, the controller 32 can compensate for such voltage fluctuations when calculating the appropriate duty cycle. If the system voltage ($V_S$) drops below or is less than the motor operating voltage, the controller 32 can continue to operate selected motors 12a–d at reduced speed. The controller 32 calculates a system wattage from the system voltage and current information. The system wattage calculation compensates for system variations and associated errors. The calculated system wattage is compared to power consumption information about the load derived by and stored in the controller 32 to determine the state of the load. In this manner, the controller 32 can detect and prevent current overloads, short circuits, soft shorts, and stalled motors. Through pulse width modulation, the controller 32 can vary the speed of operation of each motor 12a–d as well as provide additional power to a stalled motor. Additionally, the controller 32 can be commanded to perform these additional advanced motor control and load management features by way of multiplexed communication signals received through the communications port 38.

The present invention provides particular advantages when utilized to operate a plurality of motors 12a–d, including (1) a window motor for controlling the up/down position of a window, (2) a door lock motor for locking and unlocking the door, (3) a first mirror motor for controlling the left/right position of a side view mirror, and (4) a second mirror motor for controlling the up/down position of the side view mirror, in a door of a vehicle having high system voltage (e.g. twenty-four volts, thirty-six volts, forty-two volts, or forty-eighth volts). For example, if the controller 32 receives simultaneous requests to raise or lift the window, adjust the mirror, and cycle the door lock, the controller 32 can (1) shed the window request until the door lock is cycled, (2) shed the door lock request until the window is raised, or (3) reduce the duty cycle of the pulse width modulation to the window motor (i.e. slow the window lift), cycle the door lock, then resume the appropriate duty cycle to the window motor.

The circuit 10 can simultaneously operate a plurality of motors to move each motor to a predetermined position in response to a single input. The present invention also provides for simultaneous operation of multiple motors in a multi-axis structure, such as a side view mirror.

In summary, the present invention provides a circuit for simultaneously or concurrently operating a plurality of bi-directional motors in the same direction or opposite directions and at the same speed or variable speeds with a system voltage greater than a motor operating voltage.

While the invention has been described in connection with what is presently considered to be the most practical and preferred embodiment, it is to be understood that the invention is not to be limited to the disclosed embodiments but, on the contrary, is intended to cover various modifications and equivalent arrangements (e.g. utilizing the circuit in a vehicle seat application to operate the many seat motors required to control a power seat including the forward/rearward motor, up/down motor, seatback tilt motor, etc.) included within the spirit and scope of the appended claims, which scope is to be accorded the broadest interpretation so as to encompass all such modifications and equivalent structures as is permitted under the law.

What is claimed is:

1. A circuit for operating a plurality of bi-directional motors, the circuit comprising:
   a pair of terminals disposed across each motor;
   a power supply input for receiving a system voltage greater than a motor operating voltage;
   a common half bridge for providing one of power and ground to one of the pair of terminals across each motor;
   a plurality of particular half bridges, one particular half bridge for each motor, for providing the other of power and ground to the other of the pair of terminals across each motor; and
   a controller for selectively controlling the common half bridge and the particular half bridges to independently pulse width modulate system voltage for a duty cycle and provide motor operating voltage in either direction across the pair of terminals of one or more of the plurality of motors.

2. The circuit of claim 1 wherein the controller selectively controls the common half bridge and the particular half bridges to energize two or more of the plurality of motors in an order and simultaneously operate the two or more of the plurality of motors in either direction.

3. The circuit of claim 2 further comprising an A/D converter for receiving analog signals, converting the analog signals to digital signals, and transmitting the digital signals to the controller.

4. The circuit of claim 3 further comprising a current sensor for providing a system current load signal to the A/D converter.

5. The circuit of claim 4 wherein the controller adjusts the duty cycle of the pulse width modulation in response to the system current load signal.

6. The circuit of claim 4 wherein the controller alters the order of energizing the motors in response to the system current load signal.

7. The circuit of claim 3 further comprising a system voltage circuit providing a system operating voltage signal to the A/D converter.

8. The circuit of claim 7 wherein the controller adjusts the duty cycle of the pulse width modulation in response to the system voltage signal.

9. The circuit of claim 7 wherein the controller alters the order of energizing the motors in response to the system voltage signal.

10. The circuit of claim 3 further comprising a system ground voltage circuit providing a system ground voltage signal to the A/D converter.

11. The circuit of claim 10 wherein the controller adjusts the duty cycle of the pulse width modulation in response to the system ground voltage signal.

12. The circuit of claim 10 wherein the controller alters the order of energizing the motors in response to the system ground voltage signal.

13. The circuit of claim 1 wherein the common half bridge includes a high-side driver for supplying power to one of the pair of terminals across each motor and a low-side driver for connecting the one of the pair of terminals across each motor to ground.

14. The circuit of claim 1 wherein each of the particular half bridges includes a high-side driver for supplying power to the other of the pair of terminals across each motor and a low-side driver for connecting the other of the pair of terminals across each motor to ground.

15. The circuit of claim 1 wherein the controller includes a communications port for receiving and transmitting multiplexed communication signals.

16. A circuit for operating a plurality of bi-directional motors each of which has an operating voltage and a pair of terminals connected across the motor comprising:
   a common half bridge for providing one of power and ground to one terminal in said pair of terminals;
   a plurality of particular half bridges, one particular half bridge for each motor, for providing the other of power and ground to the other terminal in said pair of terminals; and
   a controller for selectively controlling the common half bridge and the particular half bridges to energize two or more of the plurality of motors in an order and simultaneously operate the two or more of the plurality of the motors in either direction by independently pulse width modulating supplied power in either direction across the pair of terminals of said two or more motors.

* * * * *